(12) United States Patent
Kim et al.

(10) Patent No.: US 12,266,202 B2
(45) Date of Patent: Apr. 1, 2025

(54) METHOD AND APPARATUS FOR CLASSIFYING DOCUMENT BASED ON ATTENTION MECHANISM AND SEMANTIC ANALYSIS

(71) Applicant: HYUNDAI MOBIS CO., LTD., Seoul (KR)

(72) Inventors: Tae Hyun Kim, Seoul (KR); Eunbin Kim, Seoul (KR); Jung Kyu Kim, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 613 days.

(21) Appl. No.: 17/505,979

(22) Filed: Oct. 20, 2021

(65) Prior Publication Data
US 2023/0027526 A1 Jan. 26, 2023

(30) Foreign Application Priority Data

Jul. 20, 2021 (KR) .................. 10-2021-0094696

(51) Int. Cl.
| | |
|---|---|
| *G06V 30/413* | (2022.01) |
| *G06F 16/2458* | (2019.01) |
| *G06F 16/33* | (2019.01) |
| *G06F 16/334* | (2025.01) |
| *G06F 16/35* | (2019.01) |

(Continued)

(52) U.S. Cl.
CPC ........ *G06V 30/413* (2022.01); *G06F 16/3347* (2019.01); *G06F 18/2155* (2023.01);
(Continued)

(58) Field of Classification Search
CPC .. G06V 30/413; G06V 30/274; G06V 30/416; G06F 18/2155; G06F 18/22; G06F 16/35; G06F 16/2462; G06F 16/3347; G06F 40/30; G06N 3/088; G06N 3/045; G06N 3/04; G06N 3/0455

See application file for complete search history.

(56) References Cited

U.S. PATENT DOCUMENTS

| | | | |
|---|---|---|---|
| 2001/0018685 A1* | 8/2001 | Saito .................. | G06F 40/289 707/999.102 |
| 2018/0032897 A1* | 2/2018 | Cao ..................... | G06N 20/10 |

(Continued)

FOREIGN PATENT DOCUMENTS

| | | | | |
|---|---|---|---|---|
| CN | 110647613 A | * | 1/2020 | |
| CN | 112835860 A | * | 5/2021 | ........... G06F 16/176 |

(Continued)

OTHER PUBLICATIONS

Yang et al., "Hierarchical Attention Networks for Document Classification," 2016, Association for Computational Linguistics, p. 1480-1489. (Year: 2016).*

*Primary Examiner* — Siamak Harandi
*Assistant Examiner* — Daniella M. DiGuglielmo
(74) *Attorney, Agent, or Firm* — Novo TechIP International PLLC

(57) ABSTRACT

The present disclosure in some embodiments provides an artificial intelligence or AI-based document classification apparatus and method for providing, based on a hierarchical attention network (HAN) and a semantic analysis technique, an evaluation of a document, and an explainable basis or supporting data for the evaluation, thereby generating an evaluation index for the document.

19 Claims, 5 Drawing Sheets

(51) Int. Cl.
*G06F 18/214* (2023.01)
*G06F 18/22* (2023.01)
*G06F 40/30* (2020.01)
*G06N 3/045* (2023.01)
*G06N 3/0455* (2023.01)
*G06N 3/088* (2023.01)
*G06V 30/262* (2022.01)
*G06V 30/416* (2022.01)

(52) U.S. Cl.
CPC .............. *G06F 18/22* (2023.01); *G06F 40/30* (2020.01); *G06N 3/0455* (2023.01); *G06N 3/088* (2013.01); *G06V 30/274* (2022.01); *G06V 30/416* (2022.01); *G06F 16/2462* (2019.01); *G06F 16/35* (2019.01); *G06N 3/045* (2023.01)

(56) References Cited

U.S. PATENT DOCUMENTS

| | | | |
|---|---|---|---|
| 2018/0293499 A1* | 10/2018 | He | G06F 40/30 |
| 2020/0210526 A1* | 7/2020 | Leibovitz | G06F 16/355 |
| 2020/0265196 A1* | 8/2020 | Ravi | G06N 20/00 |
| 2020/0372217 A1 | 11/2020 | Abuammar et al. | |
| 2021/0089594 A1* | 3/2021 | Xiong | G06N 5/022 |
| 2021/0109958 A1* | 4/2021 | Behtash | G06F 18/214 |

FOREIGN PATENT DOCUMENTS

| | | |
|---|---|---|
| KR | 10-2018-0054308 A | 5/2018 |
| KR | 10-2020-0127947 A | 11/2020 |
| KR | 10-2020-0135607 A | 12/2020 |

\* cited by examiner

METHOD AND APPARATUS FOR CLASSIFYING DOCUMENT BASED ON ATTENTION MECHANISM AND SEMANTIC ANALYSIS

CROSS-REFERENCE TO RELATED APPLICATIONS

This application is based on, and claims priority from, Korean Patent Application Number 10-2021-0094696, filed Jul. 20, 2021, the disclosure of which is incorporated by reference herein in its entirety.

BACKGROUND OF THE INVENTION

1. Field of the Invention

The present disclosure in some embodiments relates to a method and apparatus for classifying documents based on an attention mechanism and a semantic analysis. More particularly, the present disclosure relates to an artificial intelligence-based document classification apparatus and method for providing, based on a hierarchical attention network (HAN) and a semantic analysis technique, an evaluation of documents, and an explainable basis or supporting data for such evaluation, thereby generating an evaluation index for the documents.

2. Discussion of Related Art

The statements in this section merely provide background information related to the present disclosure and do not necessarily constitute prior art.

As seen all over the social systems, the contents described in one document are evaluated, and then the evaluation is considered for classifying that document. For example, the conventional recruitment task involves examining a vast number of written formal self-introduction letters, personal statements, or cover letters by applicants one by one, then determining whether each applicant is a suitable person of talent for the organization, thereby generating the document screening result. As another example, the scoring of an essay test such as an entrance exam or a state exam takes the evaluation of a vast amount of descriptive answers written by the examinees on the thesis. As yet another example, language test scoring needs to evaluate the essays written by the test takers.

A drawback in these document evaluation processes is that the evaluation or selection criteria may not be consistent depending on the subjectivity of the evaluator. For example, in the conventional recruitment task, the personnel manager finds it is difficult to apply a consistent standard to evaluating the cover letters and to present the evidence on which part of each cover letter was based to get to the evaluation result.

In the sense of securing the objectivity of the screening process, artificial intelligence (AI) technologies have been introduced for assistance which, however, is still limited to certain aspects of the interview process. Such uncertainty in the screening process can reduce the efficiency of the screening process and raise doubts among applicants about the fairness of the evaluation process. Therefore, document evaluation and classification need an improved method that can best exclude subjective intervention by humans and present an objective basis for the determinations.

BRIEF SUMMARY OF THE INVENTION

The present disclosure in some embodiments seeks to provide an artificial intelligence-based document classification apparatus and method for providing, based on a hierarchical attention network (HAN) and a semantic analysis technique, an evaluation of a document, and an explainable basis or supporting data for the evaluation, thereby generating an evaluation index for the document.

According to at least one embodiment, the present disclosure provides a method of operating a system for classifying a document, the method includes the steps of obtaining a plurality of word embeddings from a plurality of words constituting a plurality of sentences included in a document; providing, to a semantic analysis model, the plurality of word embeddings, wherein the semantic analysis model to generates, based on the plurality of word embeddings, one or more document features representing the document, the document features including a keyword similarity or a sentence similarity; extracting, from the semantic analysis model, the document features; providing, to an inference model, the plurality of word embeddings and the document features, wherein the inference model evaluates the document based on the plurality of word embeddings and the document features and generates an evaluation result of the document and support data related to the evaluation result; extracting, from the inference model, the evaluation result and the support data; and outputting document classification information including the evaluation result and the support data.

According to another embodiment, the present disclosure provides a method for training an inference model for classifying a document, the method includes steps of obtaining a plurality of word embeddings from a plurality of words constituting a plurality of sentences included in a document; obtaining a label indicating an evaluation decision, an evaluation score, or an evaluation grade of the document; obtaining, from a semantic analysis model, one or more document features representing the document, the document features including a keyword similarity or a sentence similarity; and providing, to an inference model, the plurality of word embeddings and the document features, the inference model is configured to perform: generating, based on the document features and the plurality of word embeddings, an evaluation result of the document, the valuation result indicating a probability of the evaluation decision, an estimate for the evaluation score, or an estimate for the evaluation grade; defining a loss function based on the evaluation result and the label; and updating a set of parameters of the inference model to decrease the loss function.

According to yet another embodiment, the present disclosure provides a system for classifying a document, comprising: a processor; and a computer-readable medium in communication with the processor and storing instructions that, when executed by the processor, cause the processor to control the system to perform: obtaining a plurality of word embeddings from a plurality of words constituting a plurality of sentences included in a document; providing, to a semantic analysis model, the plurality of word embeddings, wherein the semantic analysis model generates, based on the plurality of word embeddings, one or more document features representing the document, the document features including a keyword similarity or a sentence similarity; extracting, from the semantic analysis model, the document features; providing, to an inference model, the plurality of word embeddings and the document features, wherein the inference model evaluates the document based on the plurality of word embeddings and the document features and determines an evaluation result of the document and support data related to the evaluation result; extracting, from the inference model, the evaluation result and the support data;

and outputting document classification information including the evaluation result and the support data.

According to yet another embodiment, the present disclosure provides a computer program stored in a computer-readable medium for executing the steps respectively included in the method of operating a system for classifying a document.

According to yet another embodiment, the present disclosure provides a computer program stored in a computer-readable medium for executing the steps respectively included in the method for training an inference model for classifying a document As described above, according to the present disclosure in some embodiments, an artificial intelligence-based document classification apparatus and method are provided for presenting an evaluation of documents and an explainable basis for the evaluation, allowing consistent criteria to be applied to the evaluation and classification of the documents.

Additionally, according to the present disclosure in some embodiments, an objective indicator can be generated for use as a reference for the evaluation of documents by providing an evaluation of the documents and an explainable basis for evaluation based on a HAN (hierarchical attention network) and a semantic analysis technique.

DETAILED DESCRIPTION OF THE INVENTION

Figure 1:
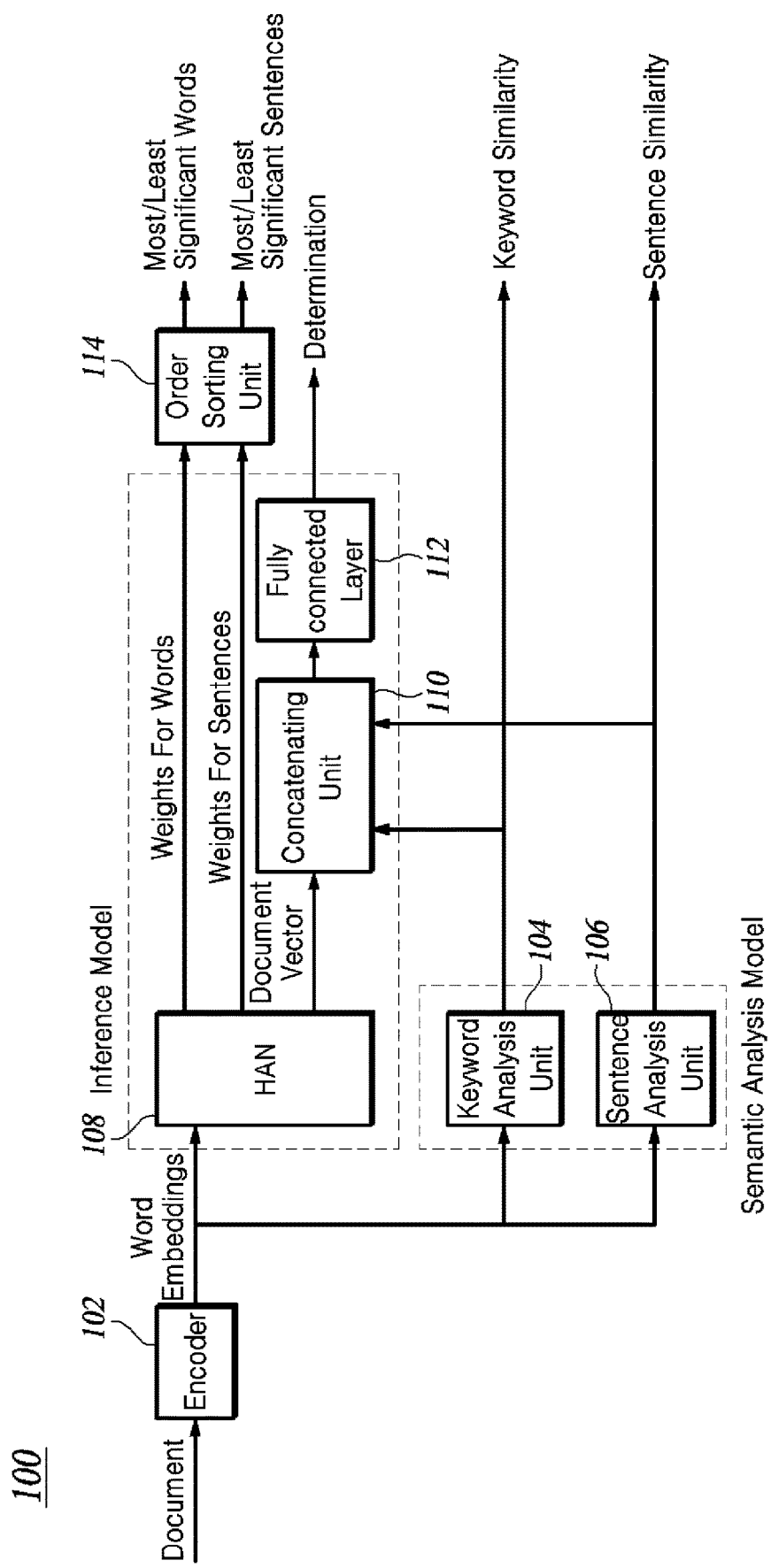
FIG. 1 is a schematic block diagram of a document classification apparatus according to at least one embodiment of the present disclosure.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and brevity.

Additionally, various terms such as first, second, A, B, (a), (b), etc., are used solely for the purpose of differentiating one component from the other but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to a unit for processing at least one function or operation, which may be implemented by hardware, software, or a combination thereof.

The detailed description to be disclosed hereinafter together with the accompanying drawings is intended to describe illustrative embodiments of the present disclosure and is not intended to represent the only embodiments in which the present disclosure may be practiced.

The illustrated embodiments disclose an apparatus and method for classifying documents based on an attention mechanism and semantic analysis. More specifically, the embodiments provide an AI-based document classification apparatus and method for providing, based on a HAN (hierarchical attention network) and a semantic analysis technique, a determination on or evaluation of documents, and an explainable basis or supporting data for the evaluation, thereby generating an evaluation index for the documents.

In the following description, documents have a hierarchical structure, that is, a document includes at least one sentence, and one sentence includes at least one word.

The document may be any document in narrative form, subject to evaluation, such as a cover letter, descriptive answer, or essay.

The evaluation of the document may be, for example, one of the evaluation decisions such as acceptance, rejection, or holding when the document is a self-introduction cover letter, and it may be an evaluation score/evaluation grade when the document is a descriptive answer or essay, wherein the evaluation score is e.g. a score of any one of the lowest to highest scores and the evaluation grade is e.g. a grade of any one of the lowest to highest grades.

FIG. 1 is a schematic block diagram of a document classification apparatus 100 according to at least one embodiment of the present disclosure.

The document classification apparatus 100 according to at least one embodiment presents, based on a HAN 108 and a semantic analysis model, a determination on or evaluation of a document, and an explainable basis or support data for the evaluation. The document classification apparatus 100 includes all or some of an encoder 102, an inference model, the semantic analysis model, and an order sorting unit 114. Here, components included in the document classification apparatus 100 according to the present disclosure are not necessarily limited to those specified above. For example, the document classification apparatus 100 may further include a training unit (not shown) for training the inference model, or it may be implemented in a form that interworks with an external training unit.

FIG. 1 is merely an illustrative configuration according to the instant embodiment, and various implementations are envisioned to include different components or different links between components depending on the type of document, the structure and operation of the encoder, the structure and operation of the inference model, the structure and operation of the semantic analysis model, the operation of the training unit, etc.

The encoder 102 encodes at least one word included in a document to generate a word embedding representing a vector corresponding to the word. As the encoder 102, any deep learning-based word embedding model may be used including word2vec, GloVe, etc. capable of generating word embeddings from words. Such a word embedding model is pre-trained by applying unsupervised learning to an unlabeled large-scale dialogue corpus.

The inference model is implemented with a deep learning-based neural network or engine and generates an evaluation of a document from representations based on word embeddings. The inference model includes the HAN 108, a concatenating unit 110, and a fully connected layer 112.

Meanwhile, the semantic analysis model performs semantic analysis by using word embeddings and thereby generates keyword similarity and sentence similarity as document features that can express a document. The semantic analysis model includes a keyword analysis unit 104 and a sentence analysis unit 106. The document features may be expressed as numerical values obtained by quantifying the intuitive characteristics included in the document.

Figure 5:
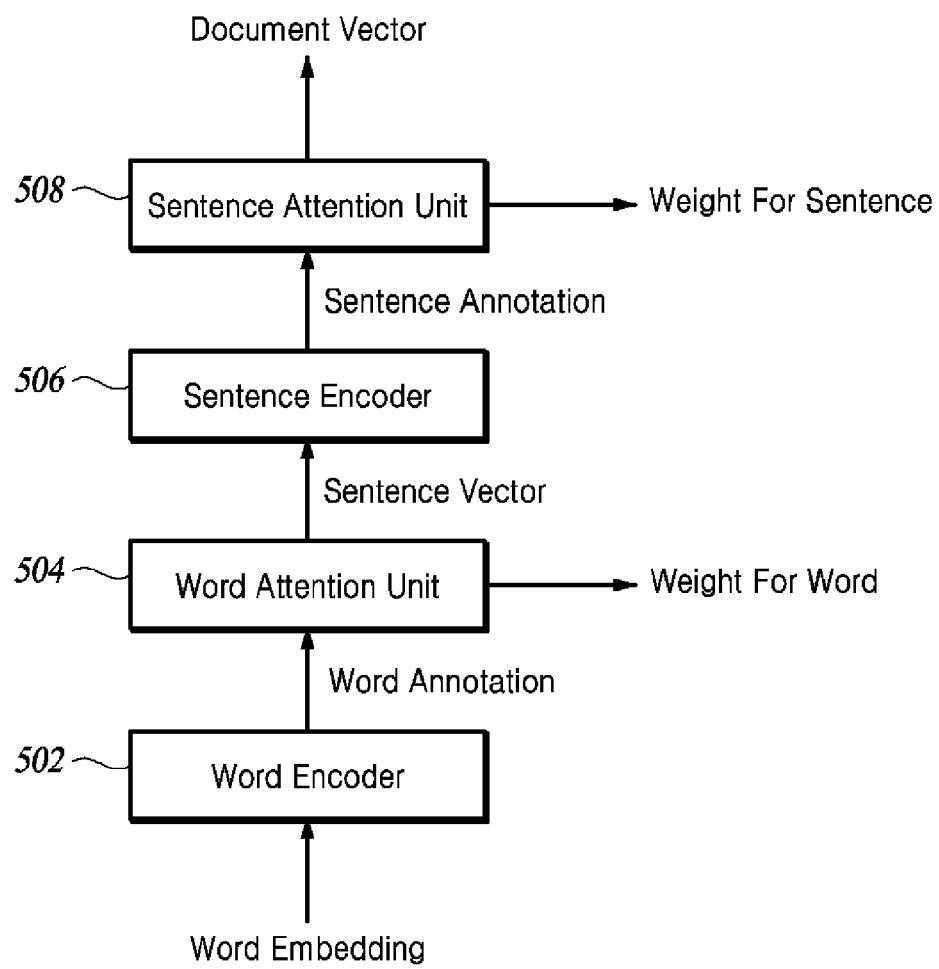
FIG. 5 is a schematic block diagram of a hierarchical attention network used by at least one embodiment of the present disclosure.

The HAN 108 included in the inference model is adapted to classify documents based on a hierarchical structure of each document, as illustrated in FIG. 5, an example of which is described in "Hierarchical attention networks for document classification" Yang, Zichao, et al., Proceedings of the 2016 conference of the North American chapter of the association for computational linguistics: human language technologies. 2016. By using an attention mechanism to generate different weights for each word and sentence by the significance thereof, the HAN 108 can improve the performance of document classification.

As illustrated in FIG. 5, the HAN 108 includes a word encoder 502, a word attention unit 504, a sentence encoder 506, and a sentence attention unit 508. The HAN 108 performs the attention mechanism twice by using the word attention unit 504 and the sentence attention unit 508.

The following first describes the application of attention to words located in a lower layer in the hierarchical structure of a document. For one sentence, the word encoder 502 encodes the word embeddings of the words to generate word annotations containing information on the words. The word attention unit 504 determines the significance of words in the sentence to calculate weights for the words and then uses those weights as the basis for carrying out weighted summation on word annotations and thereby generates a sentence vector.

The following now describes the application of attention to sentences, which are in the upper layer. For one document, the sentence encoder 506 encodes sentence vectors to generate sentence annotations containing information on the sentences. The sentence attention unit 508 determines the significance of sentences in the document to generate weights for the sentences and then uses those weights as the bases for carrying out weighted summation on sentence annotations and thereby generates a document vector.

Since the process of the HAN determining the significance of words and the significance of sentences is not within the scope of the present disclosure, no further description thereof is provided (see Non-Patent Document 1).

Meanwhile, the document vector may be used as a result of document classification, although this embodiment uses the document vector and additionally takes into account the document features generated by the semantic analysis model to improve the accuracy of document classification.

The keyword analysis unit 104 generates, based on the target keyword, a keyword similarity of the word embedding. Here, the target keyword may be expressed in the same form as word embedding and may be set in advance. For example, when a cover letter is the subject document, the target keyword may be determined by the hiring department, or when an essay is one, the target keyword may be determined as a word vector related to the subject.

The keyword similarity is a document feature indicating the number of uses of words similar to a target keyword in a document. The keyword analysis unit 104 may generate the keyword similarity by counting the number of occurrences of words having a cosine similarity between the word embedding of each word and the target keyword greater than a preset threshold.

In general, a high keyword similarity of a document indicates a high relevance to a document subject, and thus it may improve the acceptance probability.

The sentence analysis unit 106 generates a sentence similarity between sentences in the document. Here, the sentence is expressed as a sentence vector which is defined as the average of word embeddings of words in the sentence. The sentence vector herein has a definition different from the sentence vector due to the application of attention, which is used inside the HAN 108.

The sentence similarity is a document feature indicating the similarity between sentences (i.e., sentence vectors). The sentence analysis unit 106 may generate the sentence similarity by averaging the cosine similarity between sentence vectors in the document.

In general, a high sentence similarity of a document, as it indicates a high consistency to the description of the document, may also improve the acceptance probability.

The illustration above utilizes the cosine similarity as the one for generating the document features, although as long as it can express the difference between two objects to be compared, any other similarity may be used, such as Jaccard similarity, cross entropy, etc.

Although this embodiment utilizes keyword similarity and sentence similarity as document features, it is not so limited and may utilize other types of document features depending on the type of document, evaluation criteria for the document, etc. In addition, this embodiment may utilize one of keyword similarity and sentence similarity as the document feature.

The concatenating unit 110 included in the inference model generates a concatenated vector by concatenating the keyword similarity and sentence similarity generated by the semantic analysis model with the document vector generated by the HAN 108. Here, concatenating refers to a process of simply connecting vectors to be concatenated to generate a single vector.

The fully connected layer 112 generates an evaluation of the document from the concatenated vector.

For example, an output of the fully connected layer 112 may be inputted to a softmax block (not shown) to generate an evaluation. For example, the evaluation may be one of the evaluation decisions of acceptance, rejection, or holding of the document when it is a cover letter.

The inference model may be trained (in advance) by the training unit so that it can generate such evaluation based on the word embeddings of the document and the keyword similarity and sentence similarity generated by the semantic analysis model. What is trained among the components of the inference model are the HAN 108 and the fully connected layer 112. A training process for the inference model will be described below.

Meanwhile, the document classification apparatus 100 may provide, in addition to the evaluation of the document, an explainable basis or support data for the evaluation. The decision basis or support data may be provided to the person in charge of evaluation, and it may be referred to as an index for document discrimination.

The support data may include all or some of a probability of the evaluation, most/least significant words, most/least significant sentences, keyword similarity, and sentence similarity. Among the support data, the probability of the evaluation is provided by the inference model, and the keyword similarity and sentence similarity are provided by the semantic analysis model. The most/least significant words and the most/least significant sentences may be provided by the order sorting unit 114.

The order sorting unit 114 rearranges the weights corresponding to the significance of the words, which are generated according to the application of the attention to the words by the HAN 108, and sorts N words (here, N is a natural number) having the heaviest weight and N words having the lightest weight, thereby generating the most/least significant words.

Additionally, the order sorting unit 114 may rearrange the weights corresponding to the significance of the sentences, which are generated according to the application of attention to the sentences by the HAN 108, and sorts N sentences having the heaviest weight and N sentences having the lightest weight, thereby generating the most/least significant sentences.

As described above, the inference model may be implemented as a deep learning-based neural network or engine and trained to generate an evaluation of the document based on the learning document and a corresponding label.

Figure 2:
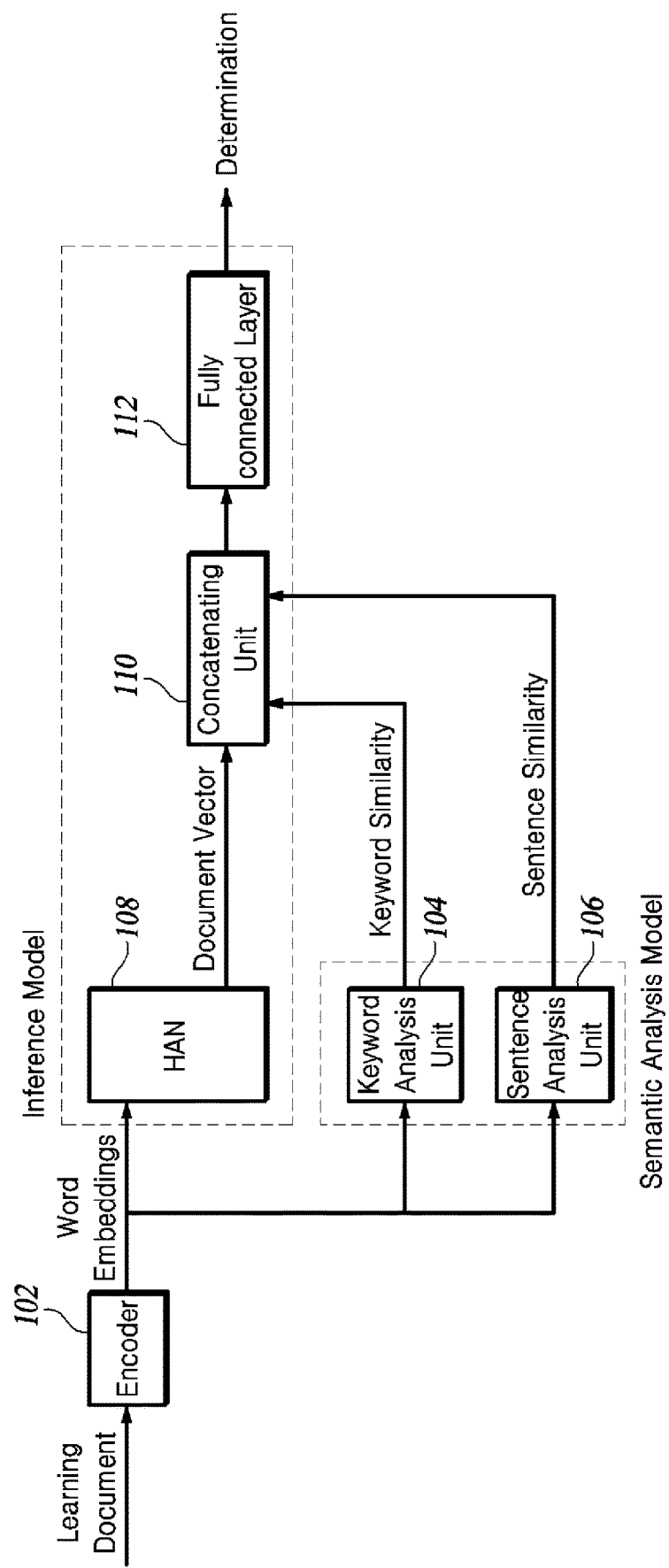
FIG. 2 is a conceptual block diagram of a learning apparatus according to at least one embodiment of the present disclosure.

The following describes a training process performed on the inference model by a training unit using a learning apparatus as shown in FIG. 2.

FIG. 2 is a conceptual block diagram of the learning apparatus according to at least one embodiment of the present disclosure.

The learning apparatus used for training an inference model includes an encoder 102, an inference model, a semantic analysis model, and the training unit (not shown).

The training unit obtains a label corresponding to a learning document. Here, the label may be an evaluation decision indicating one of acceptance, rejection, or holding for the learning document when the document is a cover letter.

The encoder 102 encodes words included in the learning document to generate word embeddings representing a corresponding vector for each word. The encoder 102 may be implemented with any deep learning-based word embedding model or engine. Such a word embedding model is trained in advance by applying an unsupervised learning method to an unlabeled large-scale corpus.

The inference model generates a determination on or evaluation of the learning document from word embeddings. The inference model includes a HAN 108, a concatenating unit 110, and a fully connected layer 112.

Meanwhile, the semantic analysis model performs semantic analysis by using word embeddings to generate keyword similarity and sentence similarity as document feature capable of expressing the learning document. The semantic analysis model includes a keyword analysis unit 104 and a sentence analysis unit 106.

As described above, the HAN 108 included in the inference model may generate a sentence vector of the learning document by performing the attention mechanism twice.

The keyword analysis unit 104 included in the semantic analysis model generates a keyword similarity of the word embeddings based on the target keyword.

The keyword similarity is a document feature indicating the number of times a word similar to a target keyword is used in the learning document. The keyword similarity may be generated by counting the number of occurrences of words whose cosine similarity of word embedding to the target keyword is greater than a preset threshold.

The sentence analysis unit 106 generates a sentence similarity between sentences in the learning document. Here, the sentence is expressed as a sentence vector which is defined as the average of word embeddings of the words in the sentence.

The sentence similarity is a document feature indicating the similarity between sentences, i.e., sentence vectors. The sentence similarity may be generated by averaging the cosine similarities between sentence vectors in the learning document.

The concatenating unit 110 included in the inference model generates a concatenated vector by concatenating the keyword similarity and sentence similarity generated by the semantic analysis model with the document vector generated by the HAN 108.

The fully connected layer 112 generates an evaluation of the learning document from the concatenated vector. The training unit may generate such evaluation by inputting the output of the fully connected layer 112 to the softmax block. For example, the evaluation may be a probability of one evaluation decision when the learning document is a letter of self-introduction, personal statement, or cover letter.

The training unit defines a loss function based on the dissimilarity between the evaluation of the learning document and the corresponding label, and updates the parameters of the inference model toward reducing the loss function, and thereby carrying out training on the inference model. Here, dissimilarity used may be anyone that can express the difference between two objects to compare, such as distance, e.g., L1 metric, L2 metric, etc., and similarity, e.g., cosine similarity, Jaccard similarity, cross entropy, Kullback-Leibler Divergence (KLD), etc.

As described above, the training unit may update parameters of the HAN 108 and the fully connected layer 112 among the components of the inference model.

The device (not shown) to be installed with the document classification apparatus 100 according to the present disclosure may be a programmable computer, and it may include at least one communication interface that can be connected to a server (not shown).

Training of the document classification apparatus 100 as described above may be performed in a device mounted with the document classification apparatus 100 by using the computing power of the same device.

Training of the document classification apparatus 100 as described above may be carried out in a server. In the server, the training unit may perform training on the deep learning-based neural network model or engine having the same structure as the inference model, which is a component of the document classification apparatus 100 mounted on the device. The server transmits the parameters of the trained deep learning-based neural network model or engine to the device through its connected communication interface, and the document classification apparatus 100 may use the received parameters to set the parameters of the inference model.

Figure 3:
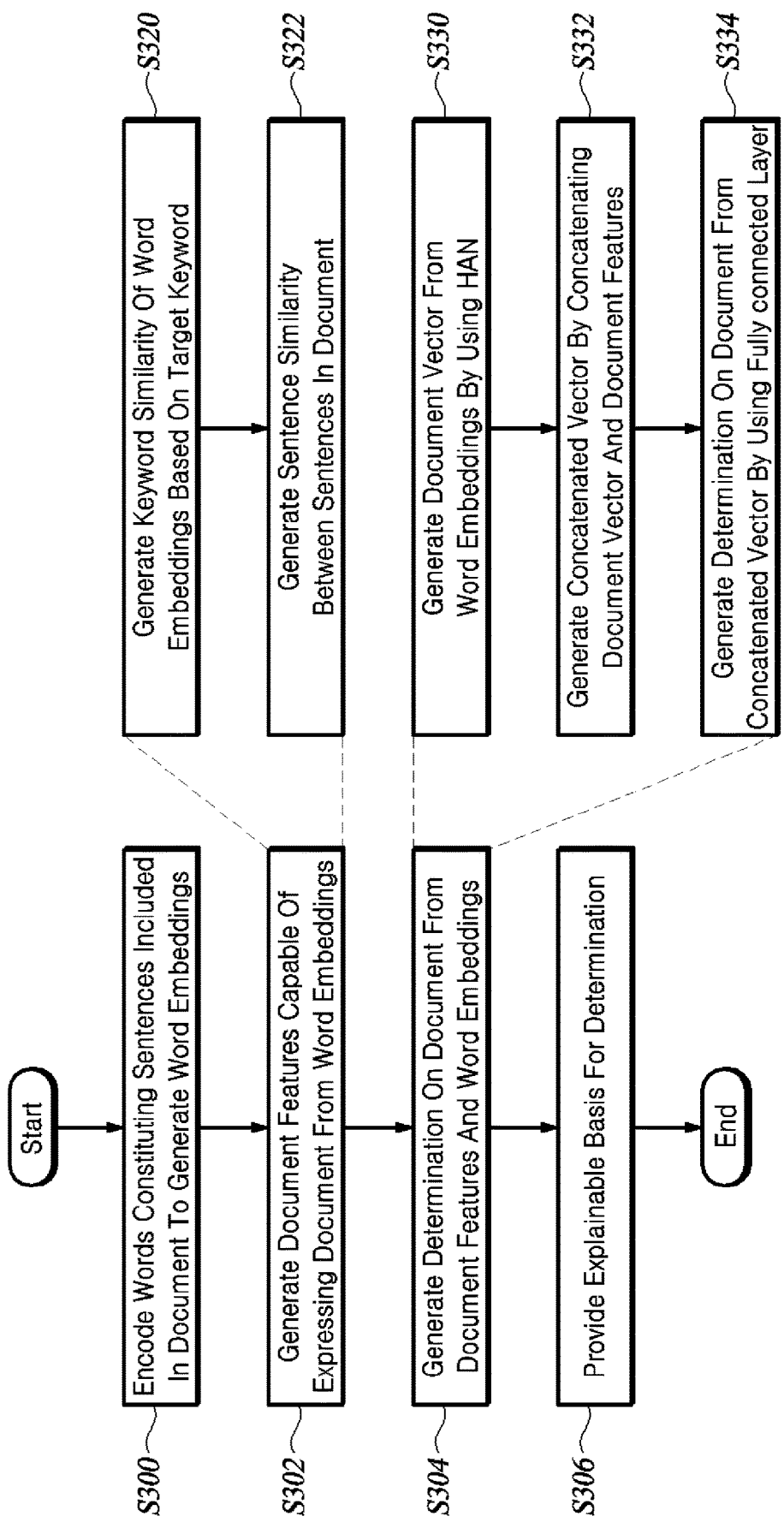
FIG. 3 is a flowchart of a method of classifying a document according to at least one embodiment of the present disclosure.

FIG. 3 is a flowchart of a method of classifying a document according to at least one embodiment of the present disclosure.

The document classification apparatus 100 uses the encoder 102 to encode the words constituting the sentences included in the document, thereby generating word embeddings (S300).

The encoder 102 for use may be any deep learning-based word embedding model or engine capable of generating word embeddings from words. Such a word embedding model may be trained in advance by applying an unsupervised learning method to a large-scale corpus that is unlabeled.

The document classification apparatus 100 utilizes a semantic analysis model for generating document features capable of expressing the document from the word embeddings (S302). Here, the document features represent keyword similarity and sentence similarity.

The following describes sub-steps S320 and S322 for generating such a document feature.

The document classification apparatus 100 generates a keyword similarity of the word embeddings based on the target keyword (S320). Here, the target keyword may be expressed in the same form as the word embeddings and may be set in advance.

The keyword similarity is a document feature indicating the number of uses of words similar to a target keyword in a document. The keyword similarity may be generated by counting the number of occurrences of words having a cosine similarity between the word embedding of each word and the target keyword greater than a preset threshold.

The document classification apparatus 100 generates a sentence similarity between sentences in the document (S322). Here, the sentence is expressed as a sentence vector which is defined as the average of the word embeddings of the words in the sentence.

The sentence similarity is a document feature indicating the similarity between sentences, i.e., sentence vectors. The sentence similarity may be generated by averaging the cosine similarity between sentence vectors in the document.

The document classification apparatus 100 utilizes the inference model for generating a determination on or evaluation of the document from the document features and the word embeddings (S304).

The following describes sub-steps of S330 and S334 for generating the evaluation.

The document classification apparatus 100 utilizes the HAN for generating a document vector from the word embeddings (S330).

Using the attention mechanism, different weights are calculated for each word and sentence according to the significance thereof in the document, and the HAN 108 uses these weights for generating a document vector. The document vector may be used as a result of document classification, although this embodiment uses the document vector and additionally takes into account the document features generated by the semantic analysis model to improve the accuracy of document classification.

The document classification apparatus 100 generates a concatenated vector by concatenating a document vector and document features (S332).

The fully connected layer is used to generate the determination on or evaluation of the document from the concatenated vector (S334). Here, the evaluation may be one of the evaluation decisions on the document when it is a resume cover letter.

The inference model may be trained (in advance) by the training unit to generate the evaluation based on the word embeddings of the document along with the keyword similarity and sentence similarity generated by the semantic analysis model.

The document classification apparatus 100 provides, in addition to the evaluation of the document, an explainable basis or support data for evaluation (S306). Here, the decision basis or support data may include all or some of the probability of the evaluation, the most/least significant words, the most/least significant sentences, the keyword similarity, and the sentence similarity.

Among the support data, the probability for the evaluation is provided by the inference model, and the keyword similarity and sentence similarity are provided by the semantic analysis model. For the process of providing the most/least significant words and the most/least significant sentences has been described above, no further description is provided.

Figure 4:
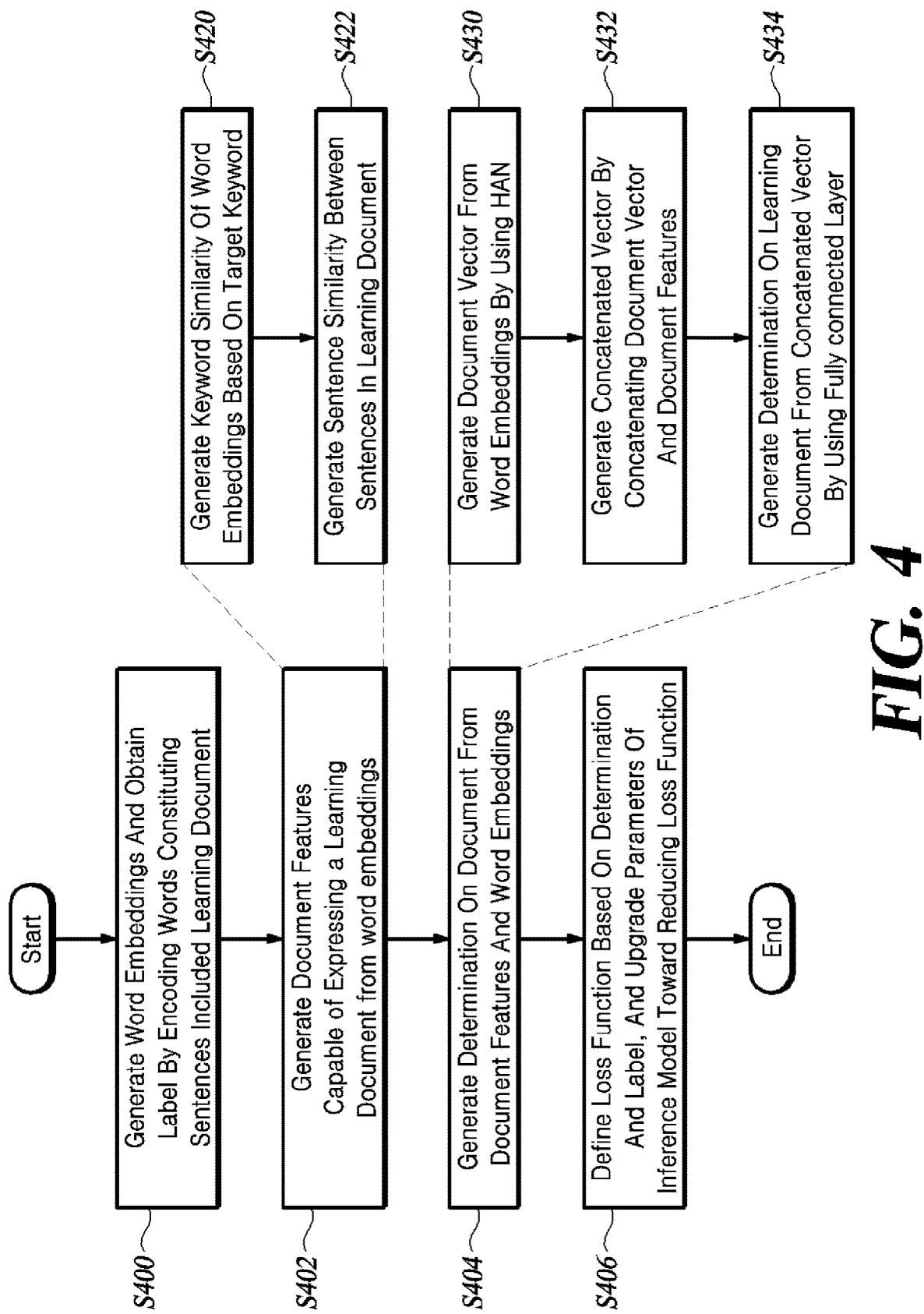
FIG. 4 is a flowchart of a method of training an inference model according to at least one embodiment of the present disclosure.

FIG. 4 is a flowchart of a method of training an inference model according to at least one embodiment of the present disclosure.

The training unit utilizes the encoder 102 to encode the words constituting the sentences included in the learning document and thereby generates word embeddings and obtains a label (S400). Here, the label may be an evaluation decision of one of acceptance, rejection, or holding of the learning document when it is a resume cover letter.

The encoder 102 used may be any deep learning-based word embedding model or engine capable of generating word embeddings from the words. Such a word embedding model may be trained in advance by applying an unsupervised learning method to a large-scale corpus that is unlabeled.

The training unit may use a semantic analysis model to generate document features capable of expressing the learning document from the word embeddings (S402). Here, the document features represent keyword similarity and sentence similarity.

The following describes sub-steps of S420 and S422 for generating such a document feature.

The training unit generates a keyword similarity of the word embeddings based on the target keyword (S420). Here, the target keyword may be expressed in the same form as the word embeddings and may be set in advance.

The keyword similarity is a document feature indicating the number of uses of words similar to a target keyword in a learning document. The keyword similarity may be generated by counting the number of occurrences of words whose cosine similarity of word embedding to the target keyword is greater than a preset threshold.

The training unit generates a sentence similarity between sentences in the learning document (S422). Here, the sentence is expressed as a sentence vector, and the sentence vector is defined as the average of word embeddings of words in the sentence.

The sentence similarity is a document feature indicating the similarity between sentences, i.e., sentence vectors. The sentence similarity may be generated by averaging the cosine similarities between sentence vectors in the learning document.

The training unit utilizes the inference model to generates a determination on or evaluation of the learning document from the document features and the word embeddings (S404).

The following describes sub-steps of S430 and S434 for generating the evaluation.

The training unit utilizes the HAN to generate a document vector from the word embeddings (S430).

Using the attention mechanism, different weights are calculated for each word and sentence according to the significance thereof in the document, and the HAN 108 generates a document vector based on these weights. The document vector may be used as a result of document classification, although this embodiment uses the document vector and additionally takes into account the document features generated by the semantic analysis model to improve the accuracy of document classification.

The training unit generates a concatenated vector by concatenating the document vector and the document features (S432).

The training unit utilizes the fully connected layer for generating the determination on or evaluation of the learning document from the concatenated vector (S434). Here, the evaluation may be a probability for an evaluation decision of one of acceptance, rejection, or holding of the learning document when it is a resume cover letter.

The training unit defines a loss function based on the evaluation and the label and updates the parameters of the inference model toward decreasing the loss function (S406). The training unit may define a loss function, for example, based on the dissimilarity between the evaluation of the learning document and the relevant label.

In at least one embodiment of the present disclosure, the document may be a cover letter. The personnel in charge of a hiring department may refer to the evaluation and support data generated by the document classification apparatus 100 as objective indices in the document evaluation process.

Here, the evaluation may be an evaluation decision inferred as one of acceptance, rejection, or holding of the document when it is a cover letter. The support data for the evaluation may include a probability for the evaluation decision. In the learning process for the inference model, the label for use is the evaluation decision on the cover letter for learning, and the inference model may generate a probability for the evaluation decision.

Meanwhile, the applicant who submitted the cover letter may predict the acceptance probability of the cover letter with the evaluation provided by the document classification apparatus 100. The applicant can also use support data to check the relevance of the cover letter to the subject and the coherence of the narrative in the cover letter before submitting it to the hiring department.

In another embodiment of the present disclosure, the document may be a descriptive answer. The evaluator of the scoring institution may refer to the evaluation and support data generated by the document classification apparatus 100 as objective indices in the answer evaluation process.

Here, when the document is a descriptive answer, the evaluation may be the inferred evaluation score or the evaluation grade, wherein the inferred evaluation score is e.g., any score from the lowest to the highest, and the evaluation grade is e.g., any one of the lowest to highest grades. The support data for the evaluation may include estimates for the evaluation score or evaluation grade. Therefore, in the learning process for the inference model, the label for use may be the evaluation score or evaluation grade of the descriptive answer for learning, and the inference model may generate the estimates for the evaluation score or evaluation grade.

Meanwhile, the examinee who submitted the descriptive answer may predict the evaluation score or evaluation grade of the descriptive answer by using the evaluation provided by the document classification apparatus 100. Additionally, the examinee may use the support data to see the topic relevance and narrative consistency of the descriptive answer.

In yet another embodiment of the present disclosure, the document may be an essay. The person in charge of the evaluation organization in the essay evaluation process may refer to the evaluation and support data generated by the document classification apparatus 100 as objective indices.

Here, when the document is an essay, the evaluation may be an inferred evaluation score (e.g., any score from the lowest score to the highest score) or evaluation grade (e.g., anyone from the lowest grade to the highest grade. The support data for the evaluation may include estimates for the evaluation score or evaluation grade. Accordingly, in the learning process for the inference model, the label for use may be the evaluation score or evaluation grade of the learning essay, and the inference model may generate the estimates for the evaluation score or evaluation grade.

Meanwhile, the test taker who submitted the essay may predict the evaluation score or evaluation grade of the essay by using the evaluation provided by the document classification apparatus 100. Additionally, the test taker may use the support data to see the subject relevance of the essay to the subject and the narrative consistency of the essay.

The document classification apparatus 100 according to the present disclosure can be applied to any document in a narrative format, i.e, documents that are not limited to the above-described examples and that require evaluation and classification, or subject to evaluation.

As described above, according to some embodiments, an artificial intelligence-based document classification apparatus and method are provided for presenting an evaluation of documents such as cover letters, descriptive answers, and evaluation essays and an explainable basis for the evaluation, allowing consistent criteria to be applied to the evaluation of documents.

Although some embodiments of the present disclosure present flowcharts with the steps thereof illustrated as being sequentially performed, they merely instantiate the technical idea of some embodiments of the present disclosure. Therefore, a person having ordinary skill in the pertinent art could incorporate various modifications, additions, and substitutions in practicing the present disclosure by changing the sequence of steps described by the respective flowcharts or by performing one or more of the steps in the flowcharts in parallel, and hence the steps in the respective flowcharts are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. Further, the computer-readable recording medium can be distributed in computer systems connected via a network, wherein the computer-readable codes can be stored and executed in a distributed mode.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of operating a system for classifying a document, the method comprising:
    obtaining a plurality of word embeddings from a plurality of words constituting a plurality of sentences included in the document;
    providing, to a semantic analysis model, the plurality of word embeddings, wherein the semantic analysis model generates, based on the plurality of word embeddings, a plurality of document features representing the document, the plurality of document features including a keyword similarity and a sentence similarity;
    extracting, from the semantic analysis model, the plurality of document features;
    providing, to an inference model, the plurality of word embeddings and the plurality of document features, wherein the inference model evaluates the document based on the plurality of word embeddings and the plurality of document features and generates an evaluation result of the document;
    extracting, from the inference model, the evaluation result; and
    outputting the evaluation result,
    wherein, for generating the evaluation result of the document, the inference model performs:
        generating, using a hierarchical attention network (HAN), a document vector from the plurality of word embeddings;
        concatenating the keyword similarity and sentence similarity with the document vector to generate a concatenated vector; and
        generating, using a fully connected layer, the evaluation result of the document based on the concatenated vector.

2. The method of claim 1, further comprising generating the plurality of word embeddings by encoding, using an encoder, the plurality of words, the encoder implemented with a deep learning engine configured to perform unsupervised learning based on an unlabeled large-scale corpus.

3. The method of claim 1, wherein the evaluation result of the document includes an evaluation decision, an evaluation score, or an evaluation grade of the document.

4. The method of claim 1, wherein:
    for generating the keyword similarity, the semantic analysis model counts a frequency of the plurality of words having a similarity between a word embedding of each word and a preset target keyword being greater than a preset threshold similarity; and
    for generating the sentence similarity of the plurality of sentences included in the document, the semantic analysis model averages the plurality of word embeddings to generate sentence vectors.

5. The method of claim 1, further comprising:
    gathering, from the inference model and the semantic analysis model, support data related to the evaluation result and the plurality of document features; and
    outputting the support data.

6. The method of claim 5, wherein the support data includes at least one of:
    an important word selected by an order of weights for the plurality of words provided by the HAN;
    an important sentence selected by an order of weights for the plurality of sentences provided by the HAN;
    the keyword similarity; and
    the sentence similarity.

7. The method of claim 1, wherein the inference model is implemented with a deep learning engine configured to perform supervised learning based on a plurality of training documents and a plurality of labels corresponding to the plurality of training documents.

8. A non-transitory computer-readable medium comprising instructions that, when executed by a processor, cause the processor to control a system for classifying a document to perform the method of claim 1.

9. A method for training an inference model for classifying a document, the method comprising:
    obtaining a plurality of word embeddings from a plurality of words constituting a plurality of sentences included in the document;
    obtaining a label indicating an evaluation decision, an evaluation score, or an evaluation grade of the document;
    obtaining, from a semantic analysis model, a plurality of document features representing the document, the plurality of document features including a keyword similarity and a sentence similarity; and
    providing, to the inference model, the plurality of word embeddings and the plurality of document features, the inference model is configured to perform:
        generating, based on the plurality of document features and the plurality of word embeddings, an evaluation result of the document, the evaluation result indicating a probability of the evaluation decision, an estimate for the evaluation score, or an estimate for the evaluation grade;
        defining a loss function based on the evaluation result and the label; and
        updating a set of parameters of the inference model to decrease the loss function,
    wherein, for generating the evaluation result, the inference model is configured to perform:
        generating, using a hierarchical attention network (HAN), a document vector from the plurality of word embeddings;
        concatenating the keyword similarity and sentence similarity with the document vector to generate a concatenated vector; and
        generating, using a fully connected layer, the evaluation result of the document based on the concatenated vector.

10. The method of claim 9, further comprising generating the plurality of word embeddings by encoding, using an encoder, the plurality of words, the encoder implemented with a deep learning engine configured to perform unsupervised learning based on an unlabeled large-scale corpus.

11. The method of claim 9, wherein:
    for generating the keyword similarity, the semantic analysis model counts a frequency of the plurality of words having a similarity between a word embedding of each word and a preset target keyword being greater than a preset threshold similarity; and
    for generating the sentence similarity of the plurality of sentences included in the document, the semantic analysis model averages the plurality of word embeddings to generate sentence vectors.

12. A non-transitory computer-readable medium comprising instructions that, when executed by a processor, cause the processor to control a system for training an inference model for classifying a document to perform the method of claim 9.

13. A system for classifying a document, comprising:
a processor; and
a computer-readable medium in communication with the processor and storing instructions that, when executed by the processor, cause the processor to control the system to perform:
obtaining a plurality of word embeddings from a plurality of words constituting a plurality of sentences included in the document;
providing, to a semantic analysis model, the plurality of word embeddings, wherein the semantic analysis model generates, based on the plurality of word embeddings, a plurality of document features representing the document, the plurality of document features including a keyword similarity and a sentence similarity;
extracting, from the semantic analysis model, the plurality of document features;
providing, to an inference model, the plurality of word embeddings and the plurality of document features, wherein the inference model evaluates the document based on the plurality of word embeddings and the plurality of document features and determines an evaluation result of the document;
extracting, from the inference model, the evaluation result; and
outputting the evaluation result,
wherein, for generating the evaluation result of the document, the inference model performs:
generating, using a hierarchical attention network (HAN), a document vector from the plurality of word embeddings;
concatenating the keyword similarity and sentence similarity with the document vector to generate a concatenated vector; and
generating, using a fully connected layer, the evaluation result of the document based on the concatenated vector.

14. The system of claim 13, wherein the instructions, when executed by the processor, further cause the processor to control the system to perform encoding, using an encoder, the plurality of words to generate the plurality of word embeddings, the encoder implemented with a deep learning engine configured to perform unsupervised learning based on an unlabeled large-scale corpus.

15. The system of claim 13, wherein the evaluation result includes an evaluation decision, an evaluation score, or an evaluation grade of the document.

16. The system of claim 13, wherein:
for generating the keyword similarity, the semantic analysis model counts a frequency of the plurality of words having a similarity between a word embedding of each word and a preset target keyword being greater than a preset threshold similarity; and
for generating the sentence similarity, the semantic analysis model averages the plurality of word embeddings to generate sentence vectors.

17. The system of claim 13, wherein the instructions, when executed by the processor, further cause the processor to control the system to perform:
gathering, from the inference model and the semantic analysis model, support data related to the evaluation result and the plurality of document features; and
outputting the support data.

18. The system of claim 17, wherein the support data includes at least one of:
an important word selected by an order of weights for the plurality of words provided by the HAN;
an important sentence selected by an order of weights for the plurality of sentences provided by the HAN;
the keyword similarity; and
the sentence similarity.

19. The system of claim 13, wherein the inference model is implemented with a deep learning engine configured to perform supervised learning based on a plurality of training documents and a plurality of labels corresponding to the plurality of training documents.

* * * * *